April 13, 1954
L. E. GOLIBERSUCH
2,674,918
DEVICE FOR PROTECTING THE ADVANCING
FILM IN MOTION PICTURE PROJECTORS
Filed March 4, 1953
2 Sheets—Sheet 1
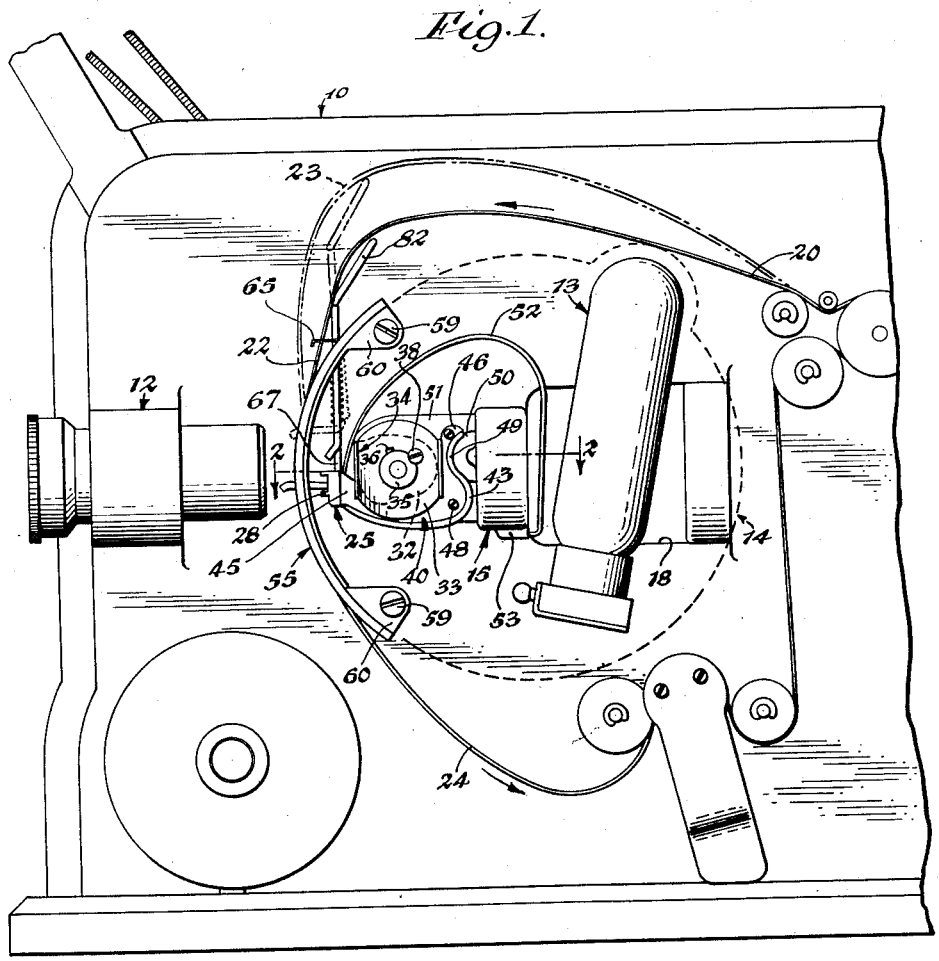
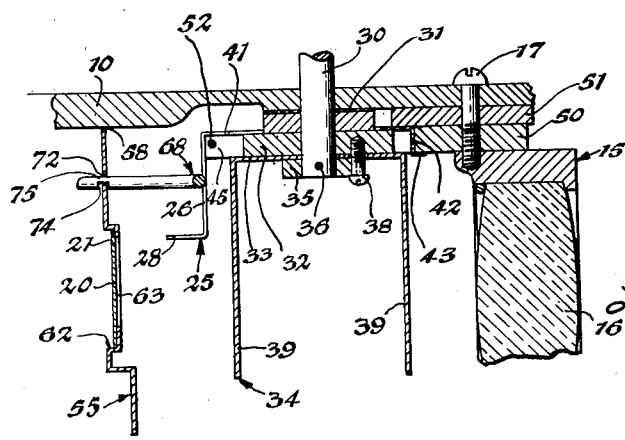
INVENTOR.
Leo E Golibersuch
BY
Poppe and Sommer
ATTORNEYS April 13, 1954    L. E. GOLIBERSUCH    2,674,918
DEVICE FOR PROTECTING THE ADVANCING
FILM IN MOTION PICTURE PROJECTORS Filed March 4, 1953      2 Sheets-Sheet 2

INVENTOR.
Leo E. Golibersuch
BY
Popp and Sommer
ATTORNEYS

Patented Apr. 13, 1954

2,674,918

UNITED STATES PATENT OFFICE 2,674,918

DEVICE FOR PROTECTING THE ADVANCING FILM IN MOTION PICTURE PROJECTORS

Leo E. Golibersuch, Buffalo, N. Y.

Application March 4, 1953, Serial No. 340,288

6 Claims. (Cl. 88—18.4)

1

The invention relates to a device for protecting the advancing film in a motion picture projector and more particularly to a device which renders inoperative the step-by-step feeding of the motion picture film when the loop provided to permit such step-by-step feeding has disappeared through some misfunctioning caused by either the film or the projector. With such a device injury to the film is prevented during that interval between the operator's noticing the misfunctioning and his being able to stop the projector.

One of the principal objects of the invention is to provide such a device which is reliable in its operation and which acts positively to stop the step-by-step film advancing mechanism of the projector when the required loop has been diminished to a predetermined minimum size.

Another important object of the invention is to provide such a device which is in the form of an attachment for standard projectors and which can easily be incorporated in a standard motion picture projector.

Another object is to provide such a protecting device which will not interfere with the normal operation of the projector but will only come into action when the loop required to provide proper step-by-step advance of the film is reduced below a predetermined value.

Another object of the invention is to provide such a protecting device which is simple and inexpensive in construction and can be produced at low cost.

Another object is to provide such a device that can readily be reset after it has operated to stop the step-by-step film advancing mechanism.

Other objects and advantages of the invention will be apparent from the following description in which:

Fig. 1 is a fragmentary side elevational view of a standard motion picture projector having enclosing cover removed to disclose the film protecting device embodying the present invention.

Fig. 2 is an enlarged horizontal section taken generally on line 2—2, Fig. 1.

Figures 3, 4, 5:
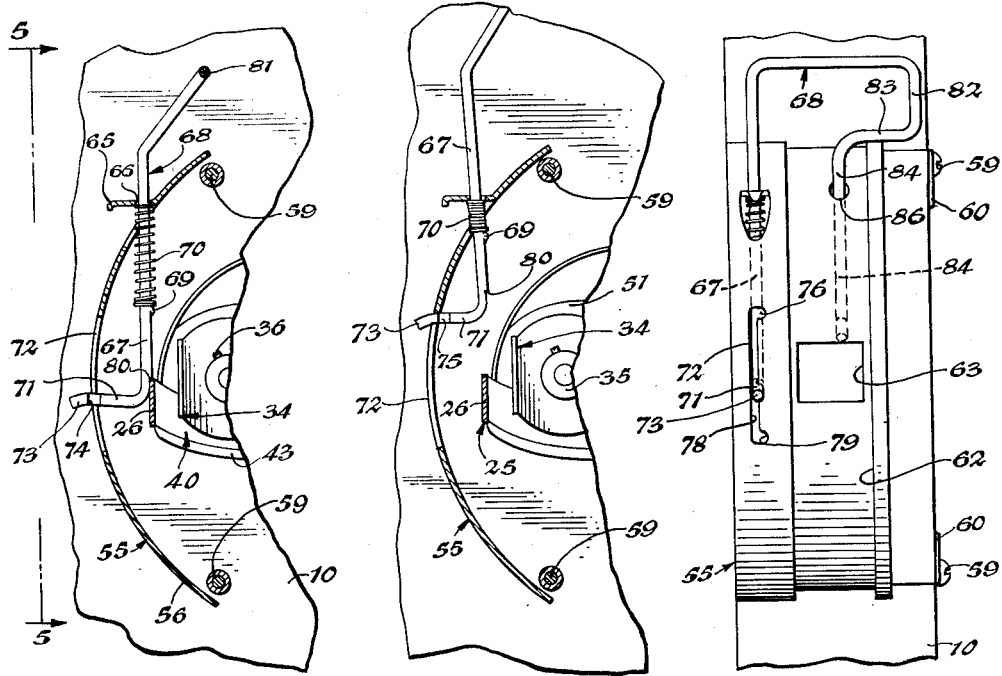

Figs. 3 and 4 are enlarged fragmentary views similar to Fig. 1 and showing the two positions of the parts, Fig. 3 showing the position of the parts where the film protecting device of the present invention is operative and has rendered the step-by-step film feeding device inoperative and Fig. 4 showing the position of the parts with the film protecting device embodying the present invention inoperative and the film feeding mechanism of the projector operative.

2

Fig. 5 is a fragmentary elevational view viewed from the line 5—5, Fig. 3.

Figure 6:
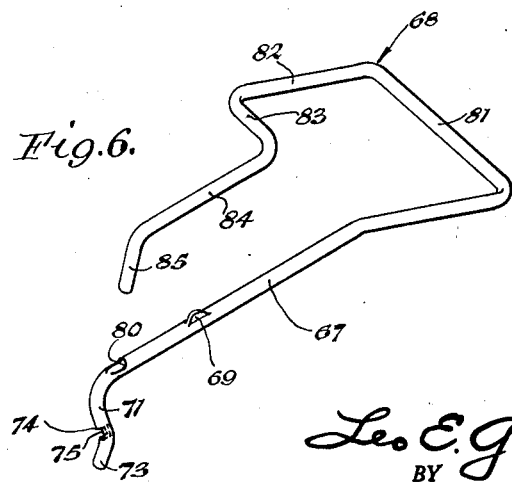

Fig. 6 is a perspective view of the principal part of the protecting device embodying the present invention.

The film protecting device embodying the present invention is shown as mounted in a standard motion picture projector having a case or housing 10 one side of which is normally enclosed by a cover which is shown as being removed to disclose the protecting device and the cooperating working parts of the projector. The case 10 is shown as having mounted in its front wall the usual adjustable lens holder 12 and through which the beam of light from a lamp 13 is projected horizontally. This lamp 13 is shown as having a reflector 14 suitably mounted in the casing 10 and this casing also supports a stationary condensing lens holder 15, containing a concentrating lens 16. This condensing lens holder 15 can be secured to the casing 10 by a screw 17 as shown in Fig. 2. The reflector 14 and concentrating lens 16 cooperate to concentrate a beam of light from the electric lamp 13 and to project it horizontally and axially through the lens holder 12. The casing is also shown as provided with an opening 18 through which a stream of cooling air can be projected against the electric lamp 13 to prevent excessive temperatures from developing within the case or housing 10.

The motion picture film 20 is provided with the usual series of spaced perforations or holes 21 which are shown in Fig. 2 as extending along one side of the film and the film is guided to travel within the casing 10, in the direction of the arrows shown in Fig. 1 by the usual guide pulleys or sprockets and to have a generally vertical stretch 22 which intersects the beam of light projected by the lamp 13 in conjunction with its reflector 14 and the concentrating lens 16 in its lens holder 15. This film 20 has the usual longitudinal series of frames and is normally threaded on the pulleys or sprockets so as to have an upper loop 23 and a lower loop 24, these loops being necessary to permit step-by-step advance of the film across the beam of light by a claw, indicated generally at 25, and which is operated in synchronism with the frames on the film 20 to successively bring one frame after the other into line with the beam of light. This claw 25 is at the end of a horizontally extending sheet metal arm 26, and has a pair of teeth 28 which are adapted to enter a corresponding pair of the holes or perforations 21 in the film, the claw 25 being thereafter moved to advance the film one frame following which the claw is withdrawn from the film and brought back into position to enter the next pair of holes 21 and advance the film another frame.

This step-by-step film advancing claw 25 is synchronized with a shutter and with the drive of the film, this part of the projector being shown as constructed as follows:

The numeral 30 represents a horizontal shaft journalled in the side wall of the housing or casing 10 as shown in Fig. 2 and is extending through a wear washer 31, a cam 32, the circular end plate 33 of a shutter 34 and an end head in the form of a ring 35. This end head or ring 35 is pinned to the shaft 30 by a pin 36 and is peripherally provided at one side with an indent through which a retaining screw 38 extends, this retaining screw anchoring in the cam 32 and extending through a hole in the circular end plate 33 of the shutter 34. It will therefore be seen that the cam 32 and shutter 34 are compelled to rotate with the shaft 30. The rotation of the shaft is synchronized with the rate of travel of the film 20 and the shutter 34 is provided with a pair of shutter wings 39 which project from the circular end plate 33 parallel and in spaced relation to the axis of the shaft 30 and across the beam of light projected by the lamp 13 and its reflector 14 and condensing lens 16. These shutter wings synchronize with the step-by-step film advancing claw 25 to cut off the beam of light at each advance step of the film so that a succession of stills are projected by the projector from the successive frames of the film 20.

The cam 32, as shown by dotted lines in Fig. 1, has a series of salient and receding portions which contact an L-shaped arm 40, preferably made of plastic, and faced on its vertical face opposite the shutter 34 with a sheet metal facing 41. This facing 41 has an outer perimetral flange 42 the free edge of which is flanged to extend perpendicularly away from the axis of the shaft 30, as indicated at 43. The arm 26 carrying the claw 25 is formed as a continuation of the flange 42, this claw 25 and its arm 26 being arranged at the extremity of the horizontal part 45 of the L-shaped plastic arm 40. The vertical part of the L-shaped plastic arm 40 is indicated at 46. The facing 41 can be secured to its plastic L-shaped arm 40 by screws 48.

The cam 32 contacts the crotched or recessed face of the L-shaped plastic arm 40. The surface of the vertical leg 46 so faced with the metal flange 42 is recessed, as indicated at 49, to fit the periphery of a fulcrum which is preferably in the form of a roller 50 about which the L-shaped arm 40 pivots. This roller is disposed against the face of a backing disk 51 and against which the metal facing 41 for the L-shaped plastic arm 40 bears.

An upwardly arching wire spring 52 is anchored at one end in the end of the horizontal leg 45 of the L-shaped plastic arm 40 and at its other end is anchored in a boss 53 at the lower end of the holder 15 for the condensing lens 15 of the lamp 13. This spring urges the L-shaped arm 40 toward the adjustable lens holder 12. The shape of the cam 32 is such that in rotation it permits the arching spring 52 to move the claw 25 toward the vertical stretch 22 of the film to engage its pair of teeth 28 with a corresponding pair of the perforations or holes 21 in the film 20; thereafter the cam 32 moves the claw 25 downwardly to advance the film one frame; thereafter the cam 32 moves the claw 25 away from the film to disengage its teeth 28 from the film; and thereafter the cam 32 permits the arching spring 52 to bring the claw 25 back to its starting position.

While the claw 25 is so moving downwardly to advance the film, one of the shutter wings 39 intercepts the beam of light from the lamp 13. It will be noted that the claw 25 is urged to its operative position by the arching wire spring 52 and that this claw can be rendered inoperative by being held against the resistance of the spring 52 and in such position that its teeth 28 cannot enter the holes or perforations 21 of the film 20.

The vertical stretch 22 of the film traverses a rounding guide, indicated generally at 55, and which comprises a curving plate 56 having one edge 58 secured against the side wall of the housing 10 by screws 59 which extend through ears 60 at the opposite edge of this plate. This guide curves about a horizontal axis generally concentric with the condensing lens holder 15 and at its center in line with the beam from the condensing lens in this holder is provided on its salient face with a vertical groove or recess 62 which forms a way or track for the film 20. This plate is provided with a rectangular opening 63 of a size sufficient to expose a frame of a film 20 and in line with the beam of light projected by the condensing lens 16.

The curved plate 56 has a horizontal ear 65 struck from the upper part of its body, this ear being struck outwardly from its convex face. This ear is provided with a hole 66 through which the vertical leg 67 of a piece of wire or wire structure 68 extends. At its lower end this leg is pinched to provide an enlarged stop 69 which forms a seat for the lower end of a helical compression spring 70. This spring surrounds the leg 67 and has its upper end fitted against the underside of the ear 65. Accordingly this spring biases the leg 67 and the structure wire 68 downwardly.

The lower end of this leg 67 is provided with a horizontal extension 71 which extends through a vertical slot 72 in the curved guide plate 56. The extremity 73 of this horizontal extension 71 is preferably bent at a slight angle to the horizontal extension 71 to extend downwardly therefrom. Near the junction between the horizontal extension 71 and its extremity 73, a side notch 74 is provided in one side of the wire to provide a contracted neck 75 in the wire.

The slot 72 is provided with an enlargement 76 at its upper end and which is of such size that the horizontal extension 71 and its extremity 73 can be passed endwise through this enlargement. The vertical part 78 of this groove is, however, narrower than the diameter of the wire forming these parts but of sufficient width to receive the restriction or neck 75 provided by the side notch 74 in the horizontal extension 71. The lower end of this slot 72 is also preferably provided with an enlargement 79 of the same size as the enlargement 76 at its upper end. At the heel of the bend between the vertical leg 67 and its horizontal extension 71, a notch is provided which forms at this heel a downwardly facing abrupt shoulder 80, this shoulder being in position to engage the upper corner of the claw 25.

Above the ear 65 the upper end of the leg 67 connects with a horizontal cross bar 81 which forms a continuation of this leg and extends transversely under the film loop 23. At its opposite end this cross bar 81 is continued downwardly, as indicated at 82, and thence horizontally, as indicated at 83, and thence downwardly to provide a second vertical leg 84 arranged parallel with the first vertical leg 67. The lower end of this second vertical leg 84 is preferably bent laterally as indicated at 85 at a slight angle to clear the shutter wings 39. This second leg extends through a hole 86 in the curved plate 56.

*Operation*

The present invention is directed to the device for protecting the film 20 in a conventional projector as above described. With such a projector in the event that the film 20 becomes worn, it not infrequently happens that the loop 23 is reduced in size by the step-by-step advancing action of the claw 25 and if this loop is eliminated completely the claw 25 can no longer advance the film step-by-step since this loop is necessary to provide intermittent movement of the film by the claw 25 with a constant feed of the film through the projector. This malfunctioning results in further injury to the film and while the operator can stop the projector and restore the loop 23, there is necessarily a lapse of time between his observing the improper operation of the projector and the stopping of the projector, during which time a substantial length of film can be torn or otherwise injured. The present invention provides a simple device for rendering inoperative the claw 25 when the loop 23 is reduced below a predetermined size so that injury to the film by eliminating this loop is automatically prevented.

The normal operative position of the safety device embodying the present invention is illustrated by dotted lines in Fig. 1 and by full lines in Fig. 4. In this position the cross bar 81 of the device is arranged in closely spaced relation to the upper loop 23 in the film 20. Also in this position the extremity 73 of the horizontal extension 71 of the first leg 67 is arranged in the enlarged upper part 76 of the slot 72 in the curved stationary guide plate 56. Since the cross sectional size or diameter of this extremity 73 is larger than the restricted vertical part of the slot 72, the leg 67 is prevented from moving downwardly in this slot 72 under the influence of the helical compression spring 70 which at this time is fully compressed as shown in Fig. 4.

In the event that the film 20 is imperfect so that in being advanced step-by-step by the claw 25, the size of the loop 23 of the film is diminished, this loop 23 moves toward the upper cross bar 81 of the device until it engages the same. If this loop continues to contract, its vertical part 22 is moved horizontally so that the wire structure 68 rotates clockwise, as viewed in Figs. 1, 3 and 4 about its supporting ear 65 as a pivot. This clockwise rotation of the wire moves the horizontal extension 71 at the end of its first vertical leg 67 in a corresponding direction and brings the side notch 74 therein into the vertical slot 72 in the curved guide plate 56. The restricted neck 75 provided by this notch 74 is of sufficiently small size to pass along the narrow vertical part of the slot 72 in the curved guide plate 56. Accordingly when this notch 74 or restricted neck 75 of the horizontal extension 71 enters the vertical part 75 of the slot 72 in the curved guide plate 56, the wire structure 68 is free to move downwardly, such downward movement being insured by the pressure of the helical compression spring 70 which biases this wire structure downwardly. Accordingly the entire wire structure 68 moves downwardly with its lower end traveling along the slot 72, this downward movement being stopped by engagement of the abrupt shoulder 80 at the heel of the vertical leg 67 with the upper corner of the claw 25. In this downward sliding movement of the wire structure 68 the first vertical leg 67 is prevented from turning about its axis by the second vertical leg 84 which slides downwardly through the hole 86.

Accordingly the downwardly facing abrupt shoulder 80 at the heel between the first vertical leg 67 and its horizontal extension 71 is held in position to engage the upper corner of the claw 25. When this occurs the claw 25 is prevented from moving forwardly under the influence of its arching spring 52. Thus as shown in Fig. 3 the notch 74 of the horizontal extension 71 of the leg 67 is disposed in the narrow part of the vertical slot 72 and hence this extension 71 is prevented from moving horizontally and with the shoulder 80 in engagement with the claw 25, this claw is likewise positively prevented from moving toward the film 20. Accordingly, the teeth 28 of this claw can no longer engage the film and hence it is rendered inoperative in advancing the film in the step-by-step advancing of the film. At the same time its teeth 28 are prevented from injury of the film which would occur if the loop 23 were eliminated entirely.

After the safety device has operated, the operator restores the loop 23 and since an uninjured part of the film is probably at this time in line with the claw 25, the projector is again ready for operation. To restore the safety device to its normal inoperative position all that is required is for the operator to lift the extremity 73 of the horizontal extension 71 of the leg 67 vertically upwardly, such movement being permitted by reason of the restricted neck 75 being arranged in the restricted part of the vertical groove 72 in the stationary curved guide plate 56. This lifts the entire wire structure 68, including the other vertical leg 84 and the upper cross part 81. When the upper end of the slot 72 is reached the operator pushes on the extremity 73 of the horizontal extension 71 so as to push this extremity into the enlarged upper end 76 of the slot 72. Since the diameter of this extremity 73 is larger than the width of the vertical part of the slot 72, this extremity seats on the shoulder provided by the enlarged part 76 of the upper end of this slot, in which position the parts are restored to the original position assumed and with the cross part 81 in closely spaced relation to the film loop 23.

From the foregoing it will be seen that the present invention provides a very simple and inexpensive safety device for protecting film in a motion picture projector against injury due to the loss of the loop necessary to provide its step-by-step movement past the beam of light. It will also be seen that the device is extremely simple and at the same time is reliable in operation and can easily be reset after it has acted to render the step-by-step advancing mechanism inoperative.

I claim:

1. A safety attachment for a motion picture projector having means for guiding a film having successive picture frames to intercept a beam of light and said film also having a longitudinal series of spaced holes, means for feeding said film to said guiding means and forming a loop in said film in advance of said guiding means, a claw having teeth engageable with said holes, spring means arranged to urge said claw to engage its teeth with said holes, and a cam arranged to move said claw to move said engaged claw to advance said film one frame, to withdraw said claw from engagement with said film, and to move said disengaged claw into position to engage the next succeeding holes of said film, comprising a member mounted intermediate its ends for sliding and limited pivotal movement in a stationary part of said projector with one end slidable into the path of said claw and with its other end arranged within said loop, a releasable latch releasably holding said member in that position in which its said other end is in closely spaced relation to said loop and in which its said one end is out of the path of said claw, and a spring interposed between said member and said stationary part and urging said member against said latch and urging said member into the path of said claw on release of said latch, said latch being released in response to movement of said other end of said member by the contraction of said loop.

2. A structure as set forth in claim 1 wherein said latch is in the form of a key-hole shaped slot in said stationary part and having its enlarged part arranged to receive and support an enlarged part of said member against the urging of said spring, and wherein said member has a contracted part movable by the contraction of said loop against said other end of said member into said key-hole slot to permit movement of said member along said key-hole slot.

3. A safety attachment for a motion picture projector having a stationary guide for guiding a film having successive picture frames to intercept a beam of light, and said film also having a longitudinal series of spaced holes, means for feeding said film to said guide and forming a loop in said film in advance of said guide, a claw having teeth engageable with said holes, spring means arranged to urge said claw to engage its teeth with said holes, and a cam arranged to move said engaged claw to advance said film one frame to withdraw said claw from engagement with said film, and to move said disengaged claw into position to engage the next succeeding holes of said film, comprising a member mounted intermediate its ends for sliding and limited pivotal movement in an opening in said guide, one end of said member being arranged within said loop and the other end being movable into the path of said claw, a releasable catch between said other end of said member and said guide and releasably holding said other end of said member out of the path of said claw, and a spring operatively interposed between said member and guide and urging said member against said latch and urging said member into the path of said claw on release of said latch, said latch being released in response to movement of said other end of said member by the contraction of said loop.

4. A safety attachment as set forth in claim 3 wherein said member is U-shaped with one leg so mounted intermediate its ends for sliding and limited pivotal movement in an opening in said guide arranged at one side of the path of said film, wherein the U-shaped member has a second leg alongside said first leg and guided in an opening in said guide at the other side of the path of said film, and wherein the cross part of the U-shaped member is at said one end of said member and is disposed in said loop.

5. A structure as set forth in claim 3 wherein said latch is in the form of a key-hole shaped slot in said guide, and wherein said member has a laterally extending arm at its said other end and which arm extends into said key-hole slot, and wherein said arm has an enlarged part adapted to be received and supported by the enlarged part of said key-hole slot and a reduced part adapted to slide along the narrower part of said key-hole slot.

6. A structure as set forth in claim 4 wherein said latch is in the form of a key-hole shaped slot in said stationary guide and wherein said one leg of said U-shaped member has a laterally extending arm at its said other end and which arm extends into said key-hole slot and wherein said arm has an enlarged part adapted to be received and supported by the enlarged part of said key-hole slot and a reduced part adapted to slide along the narrower part of said key-hole slot.

No references cited.